United States Patent [19]
Le Goff et al.

[11] Patent Number: 5,195,578
[45] Date of Patent: Mar. 23, 1993

[54] METHOD OF AND AN APPARATUS FOR TRICKLING FILM HEAT EXCHANGE

[75] Inventors: Pierre Le Goff, Nancy; Bertrand Clauzade, Lempdes, both of France

[73] Assignee: Pechiney Recherche, Courbevoie, France

[21] Appl. No.: 612,445

[22] Filed: Nov. 14, 1990

[30] Foreign Application Priority Data

Nov. 14, 1989 [FR] France ............................. 89 15283

[51] Int. Cl.⁵ .............................................. F28F 1/34
[52] U.S. Cl. ..................................... 165/115; 165/118; 165/184; 165/914; 159/13.3; 159/27.4; 159/DIG. 32; 122/39
[58] Field of Search ................ 165/115, 184, 181, 118, 165/914; 159/13.3, 27.4, DIG. 32; 261/156, 141, DIG. 65; 122/39

[56] References Cited

U.S. PATENT DOCUMENTS

| | | | |
|---|---|---|---|
| 640,122 | 12/1899 | Foreman | 165/118 |
| 1,963,857 | 6/1934 | Lucas et al. | 165/115 |
| 1,991,976 | 2/1935 | Fleisher | 165/184 |
| 2,048,902 | 7/1936 | Velut | 165/181 |
| 2,446,289 | 8/1948 | Love et al. | 165/118 |
| 2,870,999 | 1/1959 | Soderstrom | 165/184 |

FOREIGN PATENT DOCUMENTS

| | | | |
|---|---|---|---|
| 215533 | 5/1924 | United Kingdom | 159/13 B |
| 519798 | 10/1939 | United Kingdom | 165/115 |

*Primary Examiner*—Albert W. Davis, Jr.
*Attorney, Agent, or Firm*—Dennison, Meserole, Pollack & Scheiner

[57] ABSTRACT

An apparatus for heat exchange between a fluid circulating in a tube of heat conductive material and a flow of liquid in a thin layer circulating by gravity in a channel of heat conductive material, in thermal contact with the tube and disposed in the manner of a helix around the tube. The invention has application to evaporation, desorption, condensation, and absorption in chemical and physico-chemical reactors, and especially in air conditioning and refrigeration systems.

36 Claims, 6 Drawing Sheets

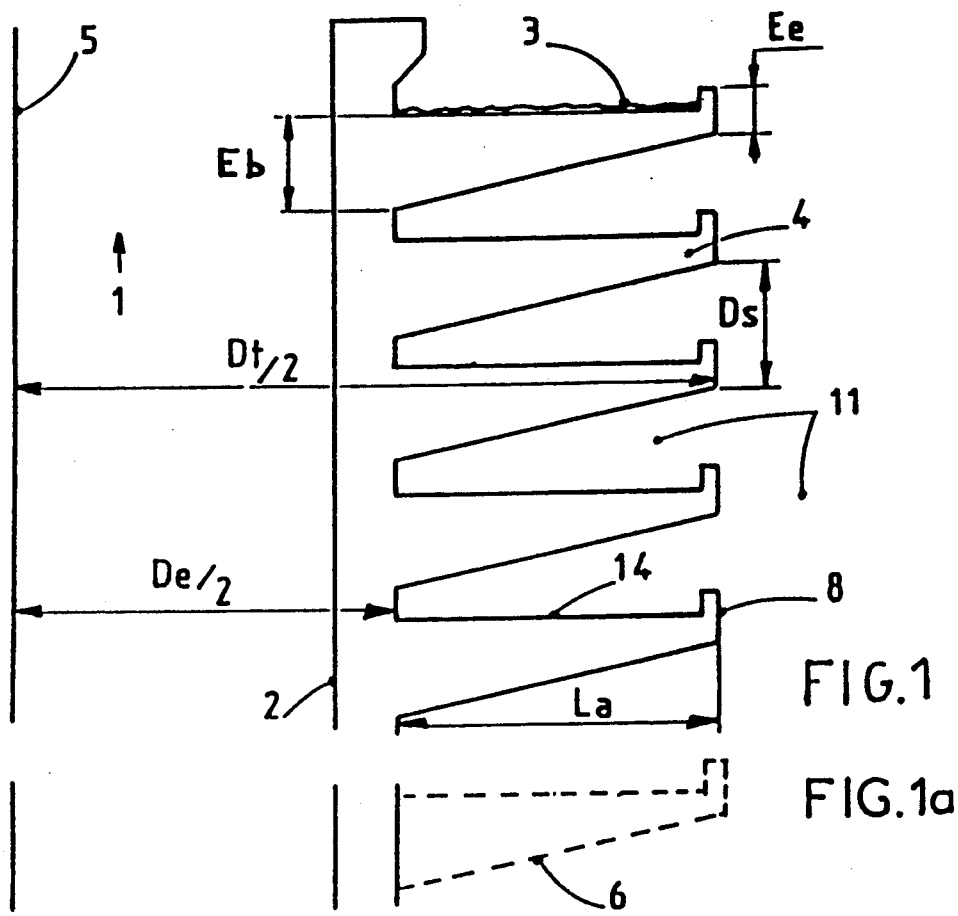
FIG.1
FIG.1a
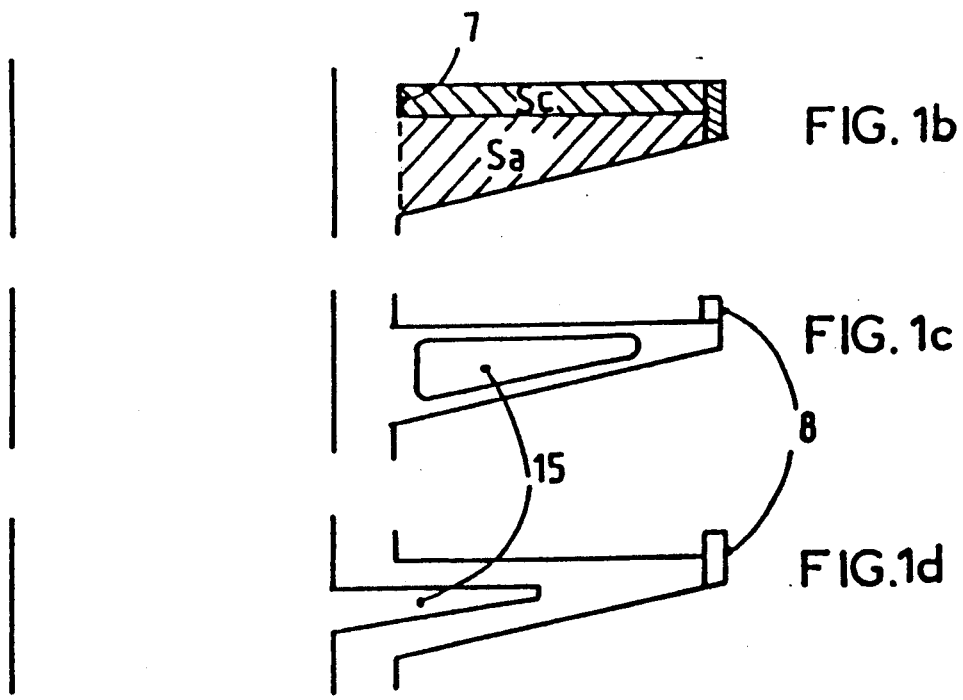
FIG.1b
FIG.1c
FIG.1d

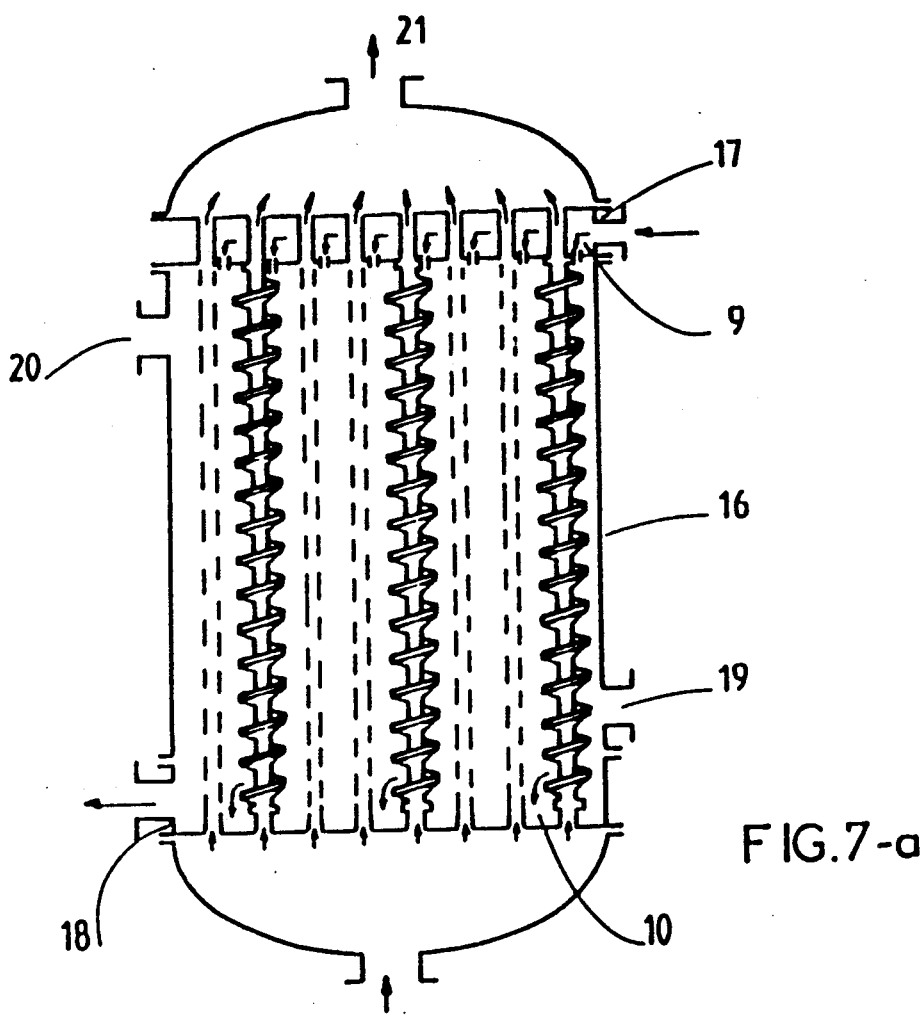
FIG.7-a
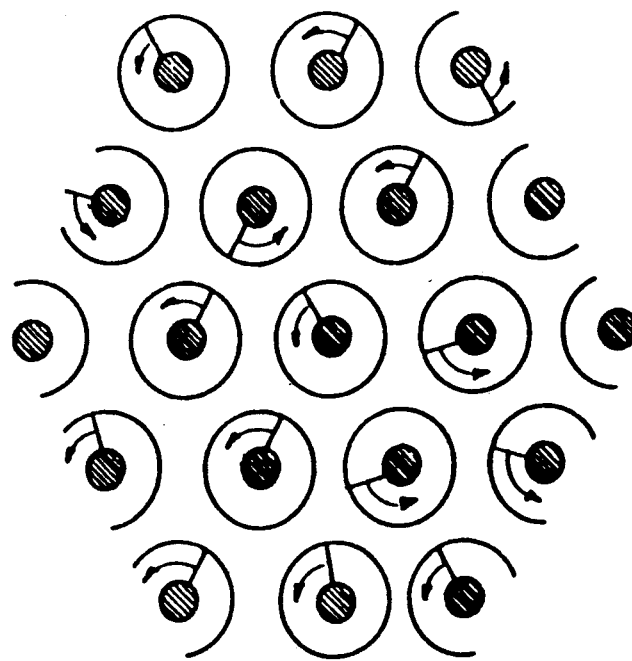
FIG.7-b

METHOD OF AND AN APPARATUS FOR TRICKLING FILM HEAT EXCHANGE

FIELD OF THE INVENTION

The present invention relates to heat exchangers and more particularly to the field of trickling film evaporators.

DESCRIPTION OF RELATED ART

Trickling film evaporators (hereinafter referred to as TFE's) are widely used in the chemicals, agro-foodstuffs, air conditioning and refrigeration industries in order to conduct heat exchanges between a fluid and a flow of liquid of minimal thickness without the formation of bubbles in the latter.

They are therefore distinctive from the boilers in which all the liquid phase to be vaporised, of relatively great thickness, is the seat of bubbles which form on the surface of the heated wall.

The TFE's have many advantages over boilers: first of all, by virtue of the absence of bubbles, their heated walls become less quickly coated with tartar; due to their high level of heat transfer, they function with a low thermal gradient which is favorable to the effective life of the equipment; finally, they allow the vaporisation of less thermally stable liquids.

However, they have two drawbacks: on the one hand, it is difficult to distribute a flow of liquid in a thin uniform layer at the head of a TFE and on the other it is difficult to retain this layer without its breaking up and collecting together in rivulets, so leading to the drying of certain areas of the heated wall.

The actual performance of a TFE can be defined mainly by two magnitudes: on the one hand, by the specific power which is the mass of liquid flow evaporated per second in relation to the total volume or to the mass of the TFE, this same notion possibly also being expressed by the transfer flow per unit of volume or mass, and on the other by the rate of evaporation which is the evaporated fraction of the liquid flow passing through the TFE. The operating viability and the level of maintenance required, although less easily quantifiable than the above-mentioned magnitudes, are also performance factors which have to be taken into account, particularly the rates of fouling, furring or corrosion.

A "basic" TFE which would consist of a simple vertical heated wall over which the film of liquid to be evaporated would trickle would exhibit the drawbacks already mentioned. Many patents describe improvements to this "basic" TFE.

Thus, in order to distribute the flow of liquid uniformly and improve the efficacy of heat transfer, European Patent No. 221 722 describes a heat exchange apparatus comprising a vertical channel, the outer surface of which is provided with "tooth-shaped" fins disposed in rows and grouped inter se, which form turbulence promoters which disperse and break up the flow of liquid along the heated wall.

In order to increase the rate of evaporation, Patent WO 82/00597 describes a heat exchange apparatus comprising a vertical channel in which a fluid circulates and on the outer surface of which there are reservoirs which permanently hold a fraction of the liquid flow which passes along the outer wall of the vertical channel, in such a way as to increase the mean dwell time of the flow of liquid in the TFE.

SUMMARY OF THE INVENTION

These two patents constitute only partial solutions which do not make it possible to attain all the desired performance. For example, European Patent No. 0 221 722 only improves the regularity of the distribution of the liquid flow by dispersing it into droplets or streams of liquid and leaves the rate of evaporation substantially at the level of that of a TFE consisting of a simple heated wall. Similarly, Patent WO 82/00597 makes it possible to increase the mean dwell time and therefore the rate of evaporation but does not improve the heat transfer flow which remains at its maximum equal to that of a simple heated wall; indeed, the flow of liquid situated in the small reservoirs, for example in the form of a cup, forms a thick layer which adversely affects the heat transfer since the conductivity of a liquid is 100 to 500 times lower than that of the conductive materials used in the TFE's. Furthermore, the accumulation of liquid in small cups increases the risk of furring and fouling during the course of operation and above all as soon as the liquid stops flowing.

The object of the invention is simultaneously to meet the three following requirements: on the one hand, a high specific power, on the other a high rate of evaporation (a high dwell time) and finally a low rate of furring and fouling, which the prior art does not simultaneously furnish.

DETAILED DESCRIPTION OF THE INVENTION

The first object of the invention is a method of heat exchange between a fluid (1) flowing inside a substantially vertical tube (2) of heat conductive material and a flow of liquid (3) outside the said tube and in contact with a gaseous phase, characterised in that the said flow of liquid is caused to descend by gravity in a thin layer supported and guided by at least one channel (14) of a heat conductive material which is in thermal contact with the said tube, the said channel being continuously inclined to the horizontal in such a way as to obtain an elevated specific power and an elevated evaporation rate.

Each channel is formed by a fin which possibly has an outer returned edge (8) and which is disposed in helical fashion about the tube (2) and its central axis (5), a part of the outer wall (7) of the tube possibly constituting a wall of the channel. A heat exchange is carried out between the fluid (1) and the flow of liquid (3) by causing the fluid to circulate within the tube, by introducing the flow of liquid through the inlet (9) to each channel situated in its upper part (see FIG. 2), so that it flows by gravity within the channel (14) and by recovering at the outlet (10) from each channel, situated in its lower part, at a different temperature and/or a different chemical composition from those which were present at the entrance to the said channel.

These characteristic features of the method make it possible to control the flow of liquid since this latter is physically guided in the bed of the helical channel (14): the mean speed of the flow of liquid and therefore its mean dwell time in the TFE is determined essentially by the angle a of the helix (see FIG. 2) which may be small, for example just a few degrees, if an elevated evaporation rate or an increased dwell time are desired;

a thin film flow of regular thickness may be obtained thanks to a channel profile (see FIG. 5) which is adapted to compensate for the centrifugal force which tends to gather the flow of liquid towards the periphery of the channel; however, obtaining a thin film which is regularly distributed over the channel also presupposes wetting of the channel by the flow of liquid.

The method also makes it possible to adapt to requirements the extent of the exchange interfaces, whether one is thinking of the liquid flow/fin interface for the heat exchange between the flow of liquid and the flow circulating in the tube, or the liquid flow/gaseous phase interface in the case of calorie and substance exchanges. The extent of these interfaces are factors which influence the specific power of the TFE.

For example, the method according to the invention makes it possible simultaneously and independently to optimise the specific power and the evaporation rate. The method also has two other characteristic features which are highly favourable in limiting fouling and furring; on the one hand, the entire liquid flow is in regular movement and on the other when the flow of liquid stops, no liquid is left standing in the TFE, both these features reducing the risks of solid deposits in the TFE. Other advantages will become apparent at the end of the description.

According to the invention, the exchange of heat energy between the fluid circulating in the tube and the flow of liquid may take place in both directions:

if the fluid is imparting calories to the flow of liquid, this latter will see its inlet temperature rise and it will undergo either an evaporation or a desorption;

if the fluid is receiving heat from the flow of liquid, there will be a condensation of the gaseous phase into a liquid phase or an adsorption of a vapour or a gas into the flow of liquid. In both cases, the flow of liquid may also be the site of chemical or physico-chemical reactions, possibly involving a solid phase which is finely divided in a suspension in the flow of liquid, either because it was introduced at the outset as a finely divided catalyst for example, or because it formed in the TFE.

The fluid circulating in the tube may be a liquid, a vapour or a gas, possibly under pressure: it may also consist of combustion gases and in this case the TFE will have a larger diameter tube (see FIG. 6).

The most normal applications of the method relate on the one hand to the field of refrigeration and air conditioning and on the other the chemical, parachemical and agro-alimentary fields, typically relating to the concentration of dilute aqueous solutions, the gas-liquid reactions which require an exchange of heat, for example absorption into water of gaseous hydrochloric acid, oxidation or hydrogenation of organic compounds. In these latter cases, it will be preferable to cause the gaseous flow to circulate in counter-current to the flow of liquid in the helical space (12) which surmounts the flow of liquid; it will also be possible to maintain the gaseous phase at a pressure other than atmospheric pressure: desorption will possibly be facilitated by a pressure below atmospheric pressure; similarly, an absorption or the maintenance of a volatile compound in the liquid state, might require a pressure greater than atmospheric pressure. In these applications, particularly in the case of gas-liquid chemical reactions, it will be possible at the head of the TFE to recycle the emerging liquid flow if the gas-liquid reaction has not achieved the desired degree of progress in one single passage.

A second object of the invention is an apparatus and an assembly of apparatuses which make it possible to carry out the method according to the invention.

For clarity of the description, the characteristic features already mentioned hereinabove in the "method" part will not be included again in the "apparatus" part.

The apparatus according to the invention is characterised firstly by the following set of parameters which define the geometrical shape of the apparatus and the values of which depend upon various criteria linked to technology, the science of chemical engineering or the practical use of the TFE's:

the central tube (2) of the TFE in which a fluid (1) is circulating may be of circular cross-section and in this case its outside diameter De is comprised between 1 mm and 1000 mm and preferably between 5 and 100 mm.

It may also have a square, rectangular (see FIG. 3), triangular, elliptical or parallelogram cross-section, of greater outside diameter De comprised between 1 mm and 2000 mm and preferably between 5 mm and 500 mm so that the fin(s) form(s) a pseudo-helix but in order not to overburden the description, the words "helix" or "helical" will also embrace the apparatus having a pseudo-helix surrounding a tube of a cross-section other than circular.

The interest of shapes other than circular shapes is obvious when a certain compactness is desired or when the TFE has to be integrated into another apparatus which calls for a constraint of a geometrical nature.

the helical fin (4) which extends around the tube has a width La in relation to the outside diameter of the tube De: the ratio La:De is comprised between 0.05 and 5 and preferably between 0.1 and 1, this ratio possibly varying with the height in one and the same TFE; indeed, for example in a method involving a high level of evaporation, it may be preferable to have a greater width of fin in the top part of the TFE than in the bottom part and in this case it is possible to avoid the frustoconical shape by simultaneously altering the fin width La and the outside diameter De in order to maintain constant the total of "La+De" over the full height of the TFE.

the helical fin has a slope, measured by the angle α the end of the fin which is most remote from the tube, and a pitch p which satisfy the equation $p = \pi \cdot Dt \cdot \tan \alpha$ for a cylindrical TFE with an outside diameter Dt (see FIG. 2); the angle α is comprised between 1° and 60° and preferably between 3° and 10° and may vary in one and the same TFE in such a way as locally to modify the rate of flow of liquid.

the helical fin has a width La in relation to its thickness at its base Eb, measured parallel with the axis of the tube; indeed, the fin is not only a support for the liquid flow, it also transmits the greater part if not all of the heat flow so that in order effectively to transmit the heat flow even at the end of the fin which is most remote from the tube, a certain thickness of the fin is required at its base: the ratio La:Eb must be less than 20 and preferably less than 10. The lower limit of this ratio is 0.5 and preferably 1: below these values, the fin has a considerable relative thickness generally unjustified by either considerations of a mechanical nature or considerations of heat transfer.

The TFE according to the invention comprises at least one helical fin but for reasons of productivity it may be worthwhile having a plurality of fins so long as this does not limit the heat transfer. The maximum number n of fins is most equal to the ratio p:Eb; the pitch p is imposed by the choice of outside diameter Dt and the angle α both of which may be basic specifications; the thickness of the fin at its base Eb may be imposed by the width La of the fin.

The thickness Ee of the fin at its end which is most remote from the tube, measured in the plane of the tube axis, may range from 0, in the case of a trapezoidal fin, to the distance Ds separating two successive turns, the said distance being equal to the ratio "pitch:number of fins".

The helical fin is described by the displacement of a generatrix (6) situated in the plane of the axis of the tube. This generatrix which may comprise curved parts, segments of straight lines, in all or in part, defines (see FIG. 1b) a fin surface Sa (fin cross-section in the plane of the tube axis) and a channel surface Sc (cross-section of the channel) bounded by the upper part of the generatrix, with possibly the outer wall of the tube and/or a fraction or the lower part of the subsequent turn situated above (FIG. 5a). These two surfaces are not independent since, all other things being equal, the surface Sa will vary according to the quantity of liquid flow and therefore according to the surface area Sc of the channel itself if the flow of liquid does not occupy it entirely: the ratio Sc:Sa is comprised between 0.1 and 10 and preferably between 0.5 and 5.

It might be advantageous to have the turns as close to one another, of the order of a few millimeters to a few tens of millimeters in order to derive the better part of the phenomena of the wetting of the surfaces by a liquid which may significantly enlarge the exchange surface areas (see FIG. 5a and b) while retaining a thin layer.

The apparatus according to the invention has other characteristic features which constitute other measures according to the invention:

the bed of the channel may be grooved, the grooves possibly being helical, in order to increase the exchange surface area in order better to channel the flow of liquid in a thin layer. It is also possible to provide the bed of the channel with a rough surface to promote turbulence to increase the transfer flow, for example by placing a removable very fine mesh grid in the bed of the channel.

It may be necessary to increase the heat exchange by using a hollow fin (FIG. 1c) in which a fluid is caused to circulate, preferably in counter-current to the flow of liquid, and possibly different from the fluid circulating in the tube. The hollow fin may also communicate with the interior of the tube (FIG. 1d).

More specially in the case of a TFE which is used for performing a chemical reaction, the tube and/or the fin, hollow or not, may be porous in such a way as likewise to permit a transfer of matter between the fluid circulating in the tube and/or the fin and the flow of liquid circulating in the channel. Thus, for example, in order progressively to cause a fluid A and a liquid B to react, to form a volatile compound C which is to be extracted as it is formed, the fluid A is caused to circulate in the porous tube and/or the porous fin, possibly hollow, and the liquid B in the helical channel; particularly by acting on the pressure of the fluid A, it is possible thus progressively to bring the reagent A in contact with the reagent B and allow extraction of the volatile compound C; it is also possible to leave the tube to function as a heat transfer fluid vehicle, the reagent A being circulated only in the hollow and porous fin.

the fin possibly comprises an outer returned edge (8) which may be in one piece with the fin or attached to it and may have a number of functions: channelling the flow of liquid, channelling furthermore the flow of gas, ensuring a heat contact with the exterior of the TFE, or it may in contrast heat insulate the TFE.

It will be understood that according to the function or functions desired, the outer edge may be of insulating or conductive material, may be of variable height and may be more or less rigid with the fin.

The TFE according to the invention consists of a tube and one or a plurality of fins, possibly with their returned edge, of materials of a thermal conductivity greater than $1 \text{ W} \cdot \text{m}^{-1} \cdot \text{K}^{-1}$ and preferably greater than $8 \text{ W} \cdot \text{m}^{-1} \cdot \text{K}^{-1}$.

The material of the tube and that of each fin may be different, just as the material of the fin may be different from that of the returned edge. These materials are preferably chosen from among:

graphite and carbonated materials which are rendered conductive of heat, shaped by any known technique such as machining, preferably automatic, extrusion etc., to the extent that the material has reached a stage of processing where it does not necessarily have final characteristics but where the shape obtained by machining, extrusion or other technique is retained.

metals and metal alloys, shaped by any known process such as machining, preferably automatic, moulding, sintering of powdered metals etc . . .

heat-conductive ceramics, shaped by any known method such as moulding, extrusion etc . . .

plastics materials rendered heat-conductive and shaped by any known method such as extrusion, injection moulding etc . . .

composite materials and multi-layer materials which are conductive of heat, shaped by any known method such as extrusion, injection moulding, moulding, pultrusion etc.

According to the invention, the TFE may be obtained by assembly of its various parts, tube, fin and possibly the returned edge, whether assembly is by mechanical means, welding, gluing or any other known assembly means. When it is desired that the gaseous phase circulate in counter-current to the flow of liquid, the returned edge will advantageously consist of a tube having an inside diameter substantially equal to the outside diameter of the TFE (in the case of a cylindrical TFE). For example, the TFE will be forced into the "returned edge" tube if a good heat contact between the fin and the "returned edge" tube is desired, that is to say if the "returned edge" tube contributes to the heat exchange. If not, then the TFE can be screwed into an internally grooved "returned edge" tube (see FIG. 4) or the TFE may simply be slid into a "returned edge" tube which has sufficient clearance for it, such a "returned edge" tube possibly consisting of the same materials as those used for the TFE or insulating materials (for example tubes or sheaths of possibly thermo-retractable plastics material).

As has been mentioned, the dispersion of a flow of liquid into a thin layer, sought after in the invention although the apparatus according to the invention may in certain cases also be used without the flow of liquid being in a thin layer, results from the actual geometry of the channel but also the wetability of the channel by the flow of liquid. To improve the wetability, it may be necessary to subject the bed of the channel to a surface treatment, for example surface oxidation. Generally, the TFE may be subjected over all or over a part of its surface to treatments which for example improve the heat conductivity of the surface (electrolytic deposits of metals) or making it possible to adjust the porosity of the tube or of the fins to the desired level.

The TFE according to the invention is a module which can be used as it is but in order to increase the processing capacity, it is desirable to have a large number of these TFE modules working in parallel and simultaneously. For this, all the modules are placed in an enclosure (16) in an arrangement which may be a compact hexagonal (see FIGS. 7 and 8) in the case of a cylindrical enclosure (16). Associated with these modules are:

means situated in the upper part of the enclosure (17) for supplying liquid flow to each module means of recovering the liquid flow at the bottom of the enclosure (18)

means permitting circulation of the gaseous phase possibly with one or more intakes, preferably in the bottom part of the enclosure (19) and with one or more outlets, preferably in the top part of the enclosure (20).

means which permit the circulation of the fluid inside the tubes and possibly fins if they are hollow.

It may also be desirable to increase the dwell time of the liquid flow by disposing TFE modules end to end and maintaining them rigid and aligned, by any known means of tube connection.

To the advantages of the invention which have already been mentioned are added a number which are linked with the hydrodynamics of the liquid flow trickling over the fins.

Experience has shown that, by the very fact of the helical shape of the fins, the liquid does not flow in parallel streams: in fact they are two opposing phenomena:

a centrifugal movement of the streams due to the actual curvature of the trajectories of the liquid a centripetal movement of the streams due to the fact that the local slope is greater in the vicinity of the inner wall than it is at the outer edge.

The result is a considerable radial blending of the various streams of liquid.

As a first consequence, it is not necessary to install at the head of the apparatus a distributor for ensuring uniform distribution of the liquid over the entire width of the fin. This uniformity is created spontaneously.

A second consequence is that the probability of dry zones appearing is reduced because they are easily "rewetted" by lateral movements of liquid.

In the case of a film of water trickling over a vertical wall, the threshold of appearance of dry zones is situated at a Reynolds number of around 30 when the flow of liquid is slowly diminished.

Well, in the case of the tube with graphite fins and 170 mm in diameter, described in Example 4, the flow has been reduced down to a Reynolds number of 10 without apparent drying out of the surface.

A third consequence is that radial blending leads to a uniform dwell time for every part of the flow of liquid, which is at one and the same time a quality constancy factor and a factor which is very favourable in the case of thermo-sensitive products.

Finally, the fourth consequence is the increase in transfer coefficient which has a direct influence on the heat transfer performance.

The following examples and the drawings illustrate the invention and make it possible more easily to understand the way it functions, its implementation and its advantages.

BRIEF DESCRIPTION OF THE DRAWINGS

The same references are used to designate similar elements which have the same function.

FIG. 1: This shows a plurality of partial views of the tube and of the turns of a spiral fin, in section according to the vertical axis of the tube.

FIGS. 1a and 1b show the following symbols:
De = outside diameter of the tube
La = fin width
Dt = outside diameter of the TFE
Eb = thickness at the base of the fin
Ee = thickness of the fin at its end
Ds = distance between successive turns
Sc = surface area of the channel (cross-section)
Sa = surface of the fin (cross-section)

FIG. 1c diagrammatically shows a hollow fin and, with FIG. 1d, illustrates other alternative forms of returned edge.

FIG. 5.

FIG. 6 shows a TFE having a large diameter tube used as a wall of a combustion chamber.

FIG. 7: FIG. 7a shows in section on a vertical axis an assembly comprising a plurality of TFE's in parallel and which shows how they function.

FIG. 7b shows in section at right-angles to the vertical axis the compact hexagonal arrangement of the TFE's.

FIG. 8 is an overall view of a TFE with the main parts separated from one another which illustrates the assembly of a TFE outfit.

EXAMPLES

EXAMPLE 1

A TFE was produced by machining an impregnated cylindrical graphite block produced by LE CARBONE LORRAINE.

Geometrical Characteristics of the TFE

Figure 2:
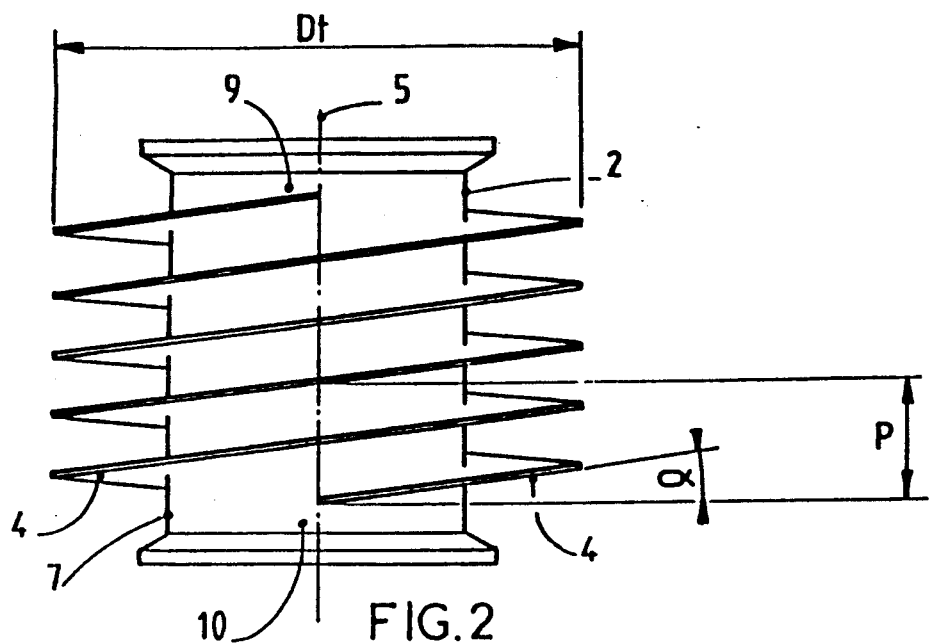
FIG. 2: This shows an outside view of a TFE with two fins on which appear the angle $\alpha$ and the pitch p of a helix.
Figure 3:
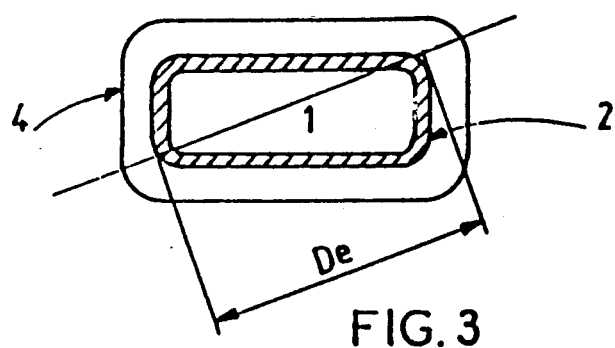
FIG. 3: This shows in cross-section at right-angles to its vertical axis a TFE of rectangular cross-section.
Figure 4:
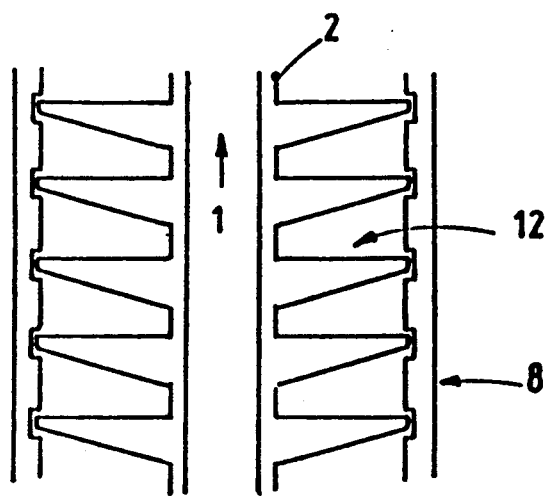
FIG. 4: This shows in section on a vertical axis a TFE on which the returned edge consists of an internally grooved tube.
Figure 5A:
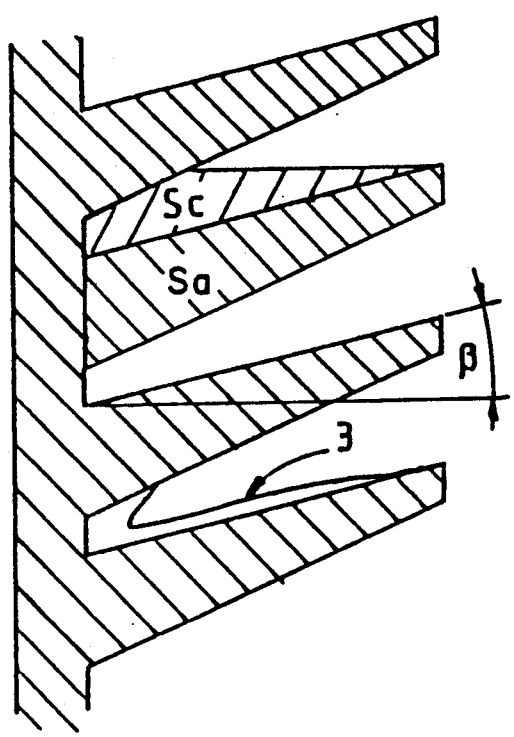
FIGS. 5a and 5b show in section on a vertical axis a partial view of a tube and of the turns of a fin, FIG. 5a being an example of a generatrix composed only of segments of a straight line whereas in FIG. 5b the generatrix comprises curves.
Figure 5B:
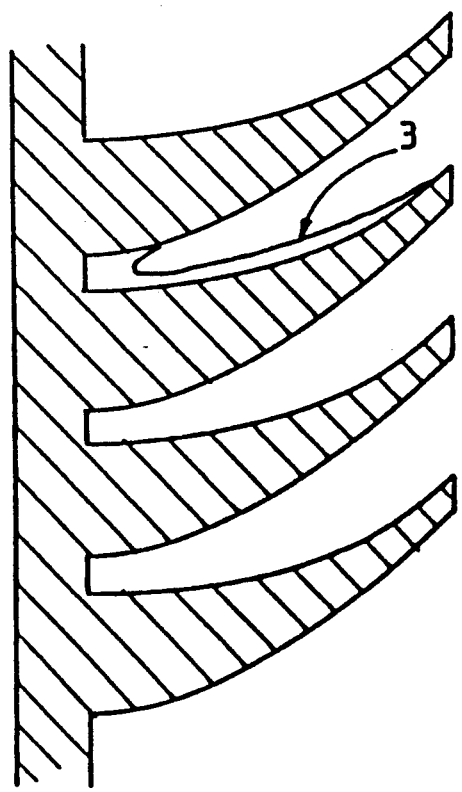

A single fin TFE of pitch p = 20 mm and of the profile shown in FIG. 5a
Outside diameter De = 50 mm
Width of fin La = 50 mm
Thickness of the fin at its base Eb = 15 mm
Thickness of the end Ee = 5 mm
Angle $\alpha$ of the helix = 2.43°
Slope $\beta$ of the channel = 6°
Height H = 800 mm Compared performance figures for this TFE against a TFE consisting of a graphite tube of the same height and the same diameter (noted by the index o):
Increase in heat exchange surface area:

$$\frac{S}{So} = 5$$

Increase in thermal power $Q(=h \cdot s \cdot \Delta T)$ $\Delta T$, which is the difference in temperature through the thickness of the trickle film, is supposed to have the same value in both cases.

h, which is the coefficient of transfer, was determined experimentally in each case: at the same rate of liquid flow the coefficient h over the fin is approx. 3 times greater than the coefficient ho on the vertical wall (ho=1 kw·m$^{31\ 2}$·K$^{-1}$ and h=3 Kw·m$^{-2}$·K$^{-1}$).

This is probably due to the turbulent blending of the streams of fluid resulting from radial circulation currents due to centrifugal force:

$$\frac{Q}{Qo} = 15$$

But having regard to the heat resistance of the fin, which is by no means nil, this ratio, for a graphite fin such as was defined above, equals about 4

$$\frac{Q'}{Qo} = 4$$

Evaporation rate:

For one and the same speed of flow u (in m.s$^{-1}$) therefore for one and the same Reynolds number, the flow of liquid flowing over the fin is:

$$M = \rho \cdot U \cdot La$$

while that flowing over the basic tube wall is:

$$Mo = \rho u \cdot \pi \cdot De$$

$$\frac{M}{Mo} = \frac{La}{\pi De} = 0,32$$

$$\frac{T}{To} = \frac{Q'/M}{Qo/Mo} = 3,14 \cdot \frac{Q'}{Qo} \approx 12$$

Finally, for one and the same rate of flow u, the dwell time ts of the liquid in the apparatus is:
for the basic cylinder:

$$tso = \frac{H}{u}$$

for a TFE according to the invention:

$$ts = \frac{H}{p} \cdot \frac{Ls}{u \cdot \sin \alpha}$$

in which Ls=the mean length of a turn (=300 mm) and $\alpha$=value of the mean slope of a turn ($\alpha$=3.8°)

$$\frac{ts}{tso} = \frac{Ls}{p \sin \alpha} = \frac{(Ls)2}{(p)2} \approx 230$$

To sum up:
the specific evaporation power has been substantially multiplied by 4
the evaporation rate has been multiplied by 12
the dwell time has been multiplied by 230
by passing from a TFE having a vertical graphite wall to the TFE according to the invention.

EXAMPLE 2

A TFE was made up by machining a cylindrical block of aluminium having the same geometrical characteristics as those in Example 1.

The subsequent experimental approach was also that of Example 1.

Summary of the results:
the specific evaporation power was multiplied by 7
the evaporation rate was multiplied by 23
the dwell time was multiplied by 230
by changing from a TFE with a vertical aluminium wall to the TFE according to the invention.

EXAMPLE 3

Figure 8:
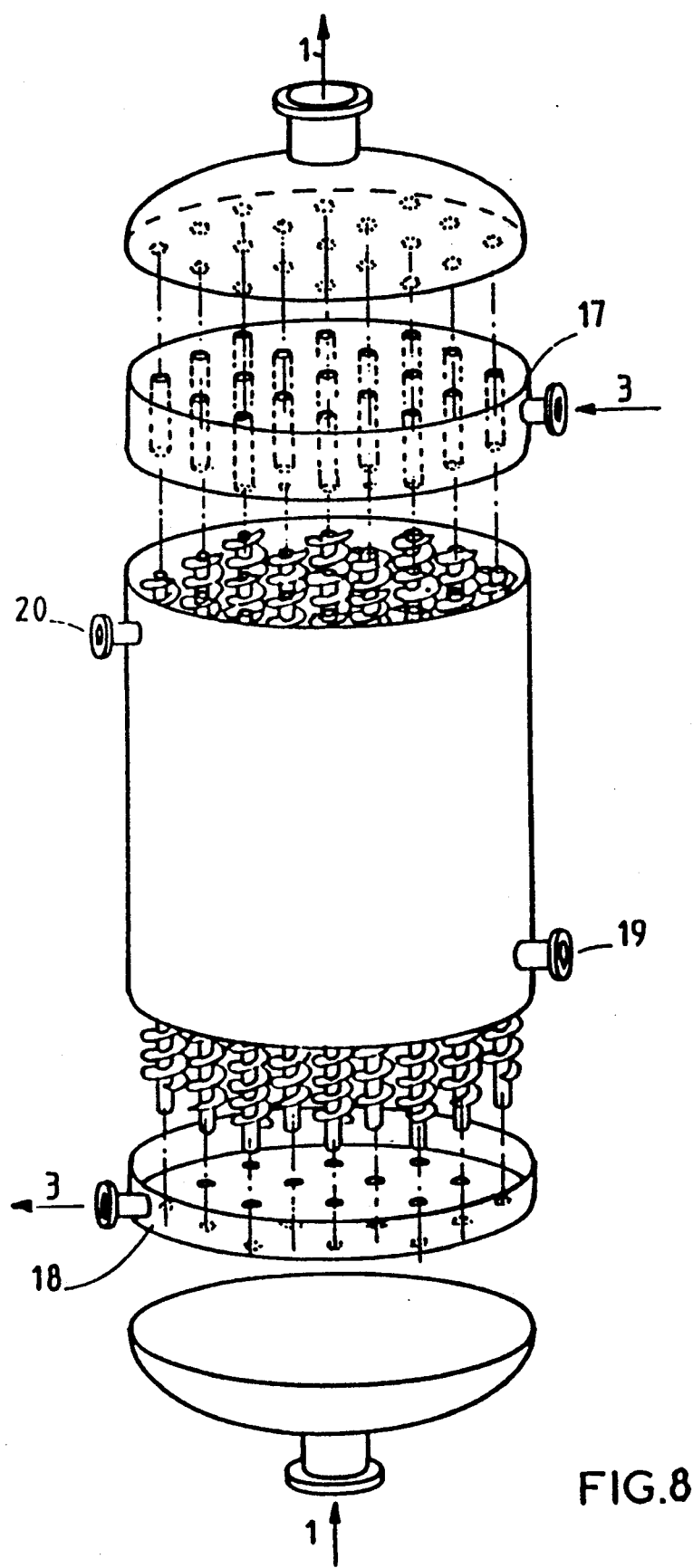
FIG. 8.

FIGS. 7 and 8 show the principle of an evaporator consisting of a nest of finned tubes contained in a vertical cylindrical drum. These tubes are heated by the passage of heated gases emanating from a combustion chamber (run on gas, fuel, ...).

The tubes are disposed according to an hexagonal structure with a distance between fin edges of 50 mm, as indicated in FIG. 7b. Thus there are 29 tubes per m$^2$ of cross-section through the drum. With h=3 kw·m$^{-2}$K$^{-1}$ and $\Delta t = 5°$ C., it is calculated that the thermal power is 11.8 kW per meter of tube while the specific power of the nest of tubes is: 340 kw/m$^3$ instead of 90 kw/m$^3$ without fins.

EXAMPLE 4

A TFE was made up by machining a cylindrical block of impregnated graphite produced by LE CARBONE LORRAINE.

Geometrical characteristics of the TFE:
Single fin TFE of pitch p=20 mm and of the profile shown in FIG. 1a
Outside diameter De=170 mm
Tube wall thickness=10 mm
Width of the fin La=52 mm
Mean angle $\alpha = 1.64°$
Height=600 mm
Results obtained:

$$\frac{S}{So} = 3$$

$$\frac{Q}{Qo} = 9 \text{ and } \frac{Q'}{Qo} = 2.3$$

$$\frac{M}{Mo} = 10.3$$

$$\frac{T}{To} = 24$$

To sum up, the specific evaporation power was multiplied by 2.3 and the rate of evaporation by 24.

EXAMPLE 5

Figure 6:
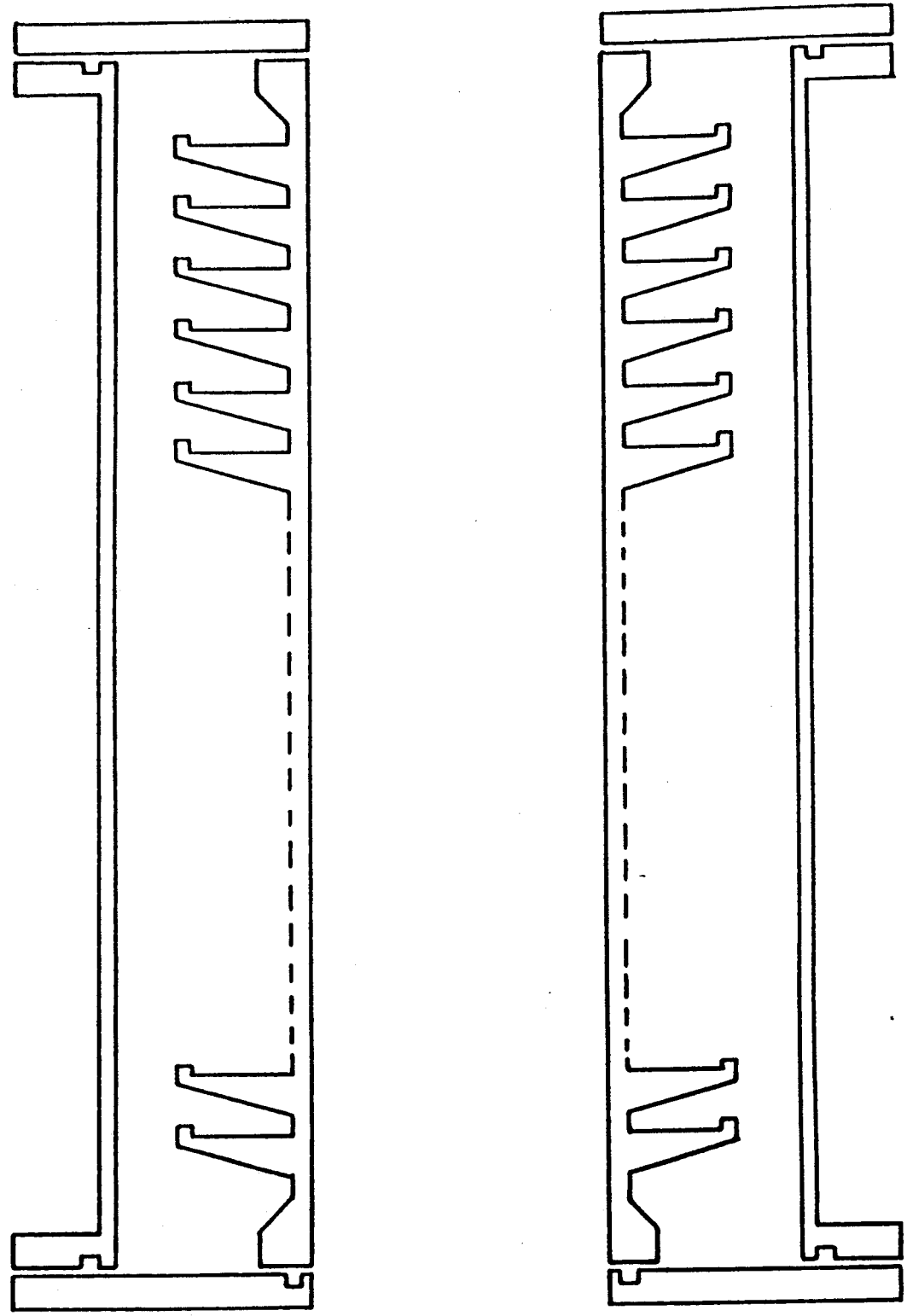
FIG. 6.

FIG. 6 shows the use of such a finned tube as the wall of a combustion chamber. Its inside diameter is 150 mm and its height is 600 mm. It is provided with 28 turns of a single helix, in other words a total surface area of 0.90 m$^2$ for evaporation purposes.

On a basis of experimental results, it is calculated that for an evaporation power Q of 12 kw, the inside face of the graphite wall (hence the wall in contact with the combustion flame) is at a temperature of 107° C., when the evaporating surface of the liquid film is 100° C.

At this low temperature, the graphite is not attacked. Experience shows that up to around 400° C., the graphite resists the corrosion from the flame even in the presence of an oxygen excess.

We claim:

1. An apparatus for heat exchange, comprising:
   a substantially vertical tube of circular cross-section having a greatest outside diameter $D_e$ between 1 mm and 1,000 mm, an outer surface, and an interior adapted for circulation of a first fluid; and
   provided on said outer surface, a pseudo-helically shaped solid fin of heat-conductive material continuously inclined with respect to the horizontal, said fin having a width $L_a$, a base portion $E_b$ at which said fin is in thermal contact with said tube, and an opposite end portion $E_e$, the thickness of said fin generally decreasing in the direction from said base portion $E_b$ toward said end portion $E_e$, the ratio $L_a/E_b$ being between about 0.5 and 3.5,
   said fin forming at least part of a channel for gravity flow of a second liquid in a thin layer therein.

2. An apparatus for heat exchange, comprising:
   a substantially vertical tube of non-circular, square, rectangular, triangular, elliptical or parallelogram cross-section having a greatest outside diameter $D_e$ between 1 mm and 2,000 mm, an outer surface, and an interior adapted for circulation of a first fluid; and
   provided on said outer surface, a pseudo-helically shaped solid fin of heat-conductive material continuously inclined with respect to the horizontal, said fin having a width $L_a$, a base portion $E_b$ at which said fin is in thermal contact with said tube, and an opposite end portion $E_e$, the thickness of said fin generally decreasing in the direction from said base portion $E_b$ toward said end portion $E_e$, the ratio $L_a/E_b$ being between about 0.5 and 3.5,
   said fin forming at least part of a channel for gravity flow of a second liquid in a thin layer therein.

3. An apparatus according to any one of claims 1 or 2 in which the ratio of the width of the fin La and the greatest outside diameter De is between 0.05 and 5.

4. An apparatus according to claim 1 or 2 in which the ratio La:De varies from the upper part of the lower part of one and the same apparatus from 0.05 to 5 or from 5 to 0.05.

5. An apparatus according to claim 1 or 2 in which the angle a of a helix or pseudo-helix formed by each fin in respect of the horizontal plane is between 1° and 60° and varies in one and the same apparatus, this angle being measured at the end of the fin which is most remote from said tube.

6. An apparatus according to claim 1 or 2 in which the ratio of the width of the fin La and the thickness of the fin at its base Eb, measured parallel with the axis of the tube and the outer surface of said tube, varies between 0.5 and 3.

7. An apparatus according to claim 1 or 2 in which the maximum number of fins n, counted in a plane perpendicular to the axis of said tube, is at most equal to the ratio of the pitch of a helix or pseudo-helix constituted by said fin and the thickness of the said fin at its base Eb.

8. An apparatus according to claim 1 or 2 in which the thickness Ee of said fin at its end varies from 0 to the distance Ds measured in the plane of the axis of said tube between two successive turns and in relation to one or a plurality of fins.

9. An apparatus according to claim 1 or 2 in which said fin has a cross-sectional profile defining a fin surface area Sa and a channel surface area Sc, measured in the plane of the axis of said tube such that the ratio Sc:Sa is between 0.1 and 10.

10. An apparatus according to claim 9 in which said fin surface area Sa is bounded by segments of a straight line.

11. An apparatus according to claim 10 in which said fin surface area Sa is bounded only by segments of a straight line.

12. An apparatus according to claim 1 or 2 in which the upper part of said fin and optionally the outer part of the tube, in contact with the liquid flow, is grooved in such a way as to increase the surface area for exchange between the liquid flow and the bed of the said channel.

13. An apparatus according to claim 1 or 2 in which the upper part of said fin and optionally the part of the tube in contact with the flow of liquid is provided with roughnesses to encourage turbulence in order to increase the transfer flow.

14. An apparatus according to claim 1 or 2 in which the material of said tube is porous and exhibits a membrane effect so that a part of the fluid is able to traverse wall of said tube, the material of said fun and interact with the liquid flow in a physical, chemical or physicochemical manner.

15. An apparatus according to claim 14 in which the material of said tube is different from the material of the said fin.

16. An apparatus according to claim 15 in which the fin comprises an outer returned edge formed of a material different from the material constituting the rest of said fin.

17. An assembly of apparatuses according to claim 1 or 2 comprising:
   an enclosure (16) containing a plurality of said apparatus, disposed parallel with one another;
   means of supplying a liquid flow and situated in the upper part of the enclosure (17);
   means of recovering the liquid flow situated in the lower part of the enclosure (18);
   means permitting circulation of a gaseous phase;
   means permitting the circulation of the fluid inside the said tube (21).

18. An assembly of apparatuses according to claim 1 or 2 in which a plurality of said apparatuses are placed end to end in respect of one another by means of joining the tubes and maintaining them in alignment.

19. An apparatus according to claim 1, or 2, wherein said fin comprises an outer returned edge at said opposite end portion $E_e$.

20. An apparatus for carrying out heat exchange comprising a substantially vertical tube (2) of circular cross-section and with an outside diameter $D_e$ comprised between 1 mm and 1000 mm, inside which a fluid (1) circulates, said tube (2) being provided on the outside with a solid helically shaped fin (4) of a heat-conductive material and in thermal contact with said tube, continuously inclined in respect of the horizontal, said fin having a width $L_a$, a base portion $E_b$ at which said fin is in thermal contact with said tube, and an opposite end portion $E_e$, the thickness of said fin generally decreasing in the direction from said base portion $E_b$ toward said end portion $E_e$, the ratio $L_a/E_b$ being between about 0.5 and 3.5, said fin (4) forming all or part of a channel (14) in order to cause a thin layer of liquid flow (3) to descend within the channel by gravity, said tube and fin formed of materials having a heat conductivity greater than $1 \text{ W} \cdot \text{m}^{-1} \cdot \text{K}^{-1}$.

21. An apparatus according to claim 20 in which the material of said tube and or of said fin is a carbonaceous material which is heat-conductive.

22. An apparatus according to claim 20 in which the material of said tube and/or of said fin is metal or a metal alloy.

23. An apparatus according to claim 20 in which the material of said tube and/or of said fin is a heat-conductive ceramic material.

24. An apparatus according to claim 20 in which the material of said tube and/or of said fin is a plastics material which has been rendered heat-conductive.

25. An apparatus according to claim 20 in which the material of said tube and/or of said fin is a heat-conductive composite or multi-layer material.

26. An apparatus according to claim 21, produced by machining or extrusion of said material at all stages of its processing in order to retain the form of said apparatus.

27. An apparatus according to claim 22, produced by machining or moulding of said material or sintering of metallic powders of said material.

28. An apparatus according to claim 23, produced by moulding or extrusion of said material.

29. An apparatus according to claim 24, produced by extrusion or injection moulding of said material.

30. An apparatus according to claim 25, produced by a method selected from the group consisting of extrusion, injection moulding, moulding and pultrusion of said material.

31. An apparatus in which the parts of the apparatus according to any one of claims 26 to 30 are assembled by a method selected from the group consisting of mechanical assembly, welding, and gluing.

32. An apparatus according to claim 31 in which an apparatus which does not have a fin comprising an outer returned edge is assembled together with an outer returned edge in order to form said channel and possibly to limit the volume of the gaseous phase just to the space between the turns of fin or fins of the said apparatus in order to permit circulation of a gaseous phase in counter-current with the liquid flow.

33. An apparatus according to claim 32 in which the outer returned edge is a tube, the inside dimensions of which correspond substantially to the outside dimensions of said apparatus.

34. An apparatus according to any one of claims 26 to 30, wherein all or part of said apparatus has been subjected to a treatment phase or a surface coating.

35. An apparatus for carrying out heat exchange comprising a substantially vertical tube (2) of circular cross-section and with an outside diameter $D_e$ comprised between 1 mm and 1000 mm, inside which a fluid (1) circulates, said tube (2) being provided on the outside with a solid helically shaped fin (4) of a heat-conductive material and in thermal contact with said tube, continuously inclined in respect of the horizontal, said fin having a width $L_a$, a base portion $E_b$ at which said fin is in thermal contact with said tube, and an opposite end portion $E_e$, the thickness of said fin generally decreasing in the direction from said base portion $E_b$ toward said end portion $E_e$, the ratio $L_a/E_b$ being between about 0.5 and 3.5, said fin (4) forming all or part of a channel (14) in order to cause a thin layer of liquid flow (3) to descend within the channel by gravity, said apparatus further comprising:

an enclosure (16) containing a plurality of said apparatus, disposed parallel with one another;

means of supplying a liquid flow and situated in the upper part of the enclosure (17);

means of recovering the liquid flow situated in the lower part of the enclosure (18);

means permitting circulation of a gaseous phase;

means permitting the circulation of a fluid inside said tube (21).

36. An apparatus for carrying out heat exchange comprising a substantially vertical tube (2) of circular cross-section and with an outside diameter $D_e$ between 1 mm and 1000 mm, inside which a fluid (1) circulates, said tube (2) being provided on the outside with a solid helically shaped fin (4) of a heat-conductive material formed in unitary manner with said tube, continuously inclined in respect of the horizontal, said fin having a width $L_a$, a base portion $E_b$ at which said fin is in thermal contact with said tube, and an opposite end portion $E_e$, the thickness of said fin generally decreasing in the direction from said base portion $E_b$ toward said end portion $E_e$, the ratio $L_a/E_b$ being between about 0.5 and 3.5, said fin (4) forming all or part of a channel (14) in order to cause a thin layer of liquid flow (3) to descend within the channel by gravity.

* * * * *

UNITED STATES PATENT AND TRADEMARK OFFICE
CERTIFICATE OF CORRECTION

PATENT NO. : 5,195,578
DATED : March 23, 1993
INVENTOR(S) : Pierre Le Goff et al It is certified that error appears in the above-identified patent and that said Letters Patent is hereby corrected as shown below:

Column 2, line 65, change "a" to --$\alpha$--.

Column 9, line 36, rewrite as follows: --$M = \rho.u.La$--.

Claim 5, column 11, line 54, change "a" to --$\alpha$--.

Signed and Sealed this

Fourth Day of January, 1994

Attest:

BRUCE LEHMAN

*Attesting Officer*   Commissioner of Patents and Trademarks